United States Patent
Marra et al.

(10) Patent No.: US 10,864,679 B2
(45) Date of Patent: Dec. 15, 2020

(54) METHOD OF MANUFACTURING AN OPTOELECTRONIC SENSOR

(71) Applicant: SICK AG, Waldkirch (DE)

(72) Inventors: Martin Marra, Waldkirch (DE); Oliver Ostojic, Waldkirch (DE)

(73) Assignee: SICK AG, Waldkirch (DE)

( * ) Notice: Subject to any disclaimer, the term of this patent is extended or adjusted under 35 U.S.C. 154(b) by 172 days.

(21) Appl. No.: 16/035,751

(22) Filed: Jul. 16, 2018

(65) Prior Publication Data
US 2019/0022948 A1    Jan. 24, 2019

(30) Foreign Application Priority Data

Jul. 21, 2017 (DE) .................. 10 2017 116 492

(51) Int. Cl.
| | | |
|---|---|---|
| B29C 64/393 | (2017.01) | |
| G01S 7/481 | (2006.01) | |
| G01S 7/497 | (2006.01) | |
| B33Y 10/00 | (2015.01) | |
| B33Y 50/02 | (2015.01) | |
| B33Y 80/00 | (2015.01) | |

(52) U.S. Cl.
CPC ............ *B29C 64/393* (2017.08); *B33Y 10/00* (2014.12); *B33Y 50/02* (2014.12); *B33Y 80/00* (2014.12); *G01S 7/4816* (2013.01); *G01S 7/497* (2013.01)

(58) Field of Classification Search
CPC ..... B29C 64/393; G01S 7/4816; G01S 7/497; B33Y 10/00; B33Y 50/02; B33Y 80/00
See application file for complete search history.

(56) References Cited

U.S. PATENT DOCUMENTS

| | | | | |
|---|---|---|---|---|
| 4,864,121 A | * | 9/1989 | Pietzsch | .................... G01V 8/22 |
| | | | | 250/221 |
| 2007/0063043 A1 | * | 3/2007 | Heinrich | ............ G06K 7/10722 |
| | | | | 235/454 |
| 2017/0168144 A1 | * | 6/2017 | Gimpel | .................... G01S 17/42 |

FOREIGN PATENT DOCUMENTS

| | | |
|---|---|---|
| DE | 102008027482 A1 | 12/2009 |
| DE | 102013215627 A1 | 2/2015 |
| DE | 102014102420 A1 | 8/2015 |
| JP | 2000-131506 A | 5/2000 |

OTHER PUBLICATIONS

German Office Action dated May 7, 2018 in corresponding German Patent Application No. 102017116492.8.

* cited by examiner

*Primary Examiner* — Mathieu D Vargot

(74) *Attorney, Agent, or Firm* — Nath, Goldberg & Meyer; Jerald L. Meyer

(57) ABSTRACT

A method of manufacturing an optoelectronic sensor (10) is provided that has a reception unit (22) having a reception optics (24), a light receiver (28), and a diaphragm (26) therebetween, wherein the diaphragm (26) is arranged in a focal plane of the reception optics (24) so that a received light beam (20) generated by the reception optics is incident through the diaphragm aperture (42) of the diaphragm (26) at the point of smallest constriction. The diaphragm (26) is manufactured as an individual diaphragm using the reception optics (24).

18 Claims, 4 Drawing Sheets

METHOD OF MANUFACTURING AN OPTOELECTRONIC SENSOR

FIELD

The invention relates to a method of manufacturing an optoelectronic sensor that comprises a reception unit having a reception optics, a light receiver, and a diaphragm arranged therebetween.

BACKGROUND

The selection of the reception element and the optical design of such a sensor have a substantial influence on its performance. To be able to detect even small reception intensities, avalanche photodiodes (APDs) are used in some cases. The incident light here triggers a controlled avalanche effect. The charge carriers generated by incident photons are thereby multiplied and a photocurrent is produced that is proportional to the received light intensity, but that is in this respect substantially larger than with a simple PIN diode.

An even greater sensitivity is achieved with avalanche photodiodes that are operated in the so-called Geiger mode (SPADs, single-photon avalanche diodes. also SiPM, silicon photomultiplier). In this respect, the avalanche photodiode is biased above the breakdown voltage such that a single charge carrier released by a single photon can already trigger an avalanche that is no longer controlled and that then recruits all the available charge carriers due to the high field strength. The avalanche photodiode thus, like the eponymous Geiger counter, counts individual events. Avalanche photodiodes in Geiger mode are not only highly sensitive, but also comparatively inexpensive. They can additionally be integrated on a circuit board with little effort.

In distance-measuring systems, a distance from the object is also determined in addition to the pure object detection. Distance sensors in accordance with the time of flight principle for this purpose measure the time of flight of a light signal that corresponds to the distance via the speed of light. A distinction is conventionally made between pulse-based measurement and phase-based measurement. In a pulse time of flight process, a brief light pulse is transmitted and the time up to the reception of a remission or reflection of the light pulse is measured. Alternatively, in a phase process, transmitted light is amplitude modulated and a phase shift between the transmitted light and the received light is determined, with the phase shift likewise being a measure for the time off flight.

In most cases and in particular in distance measurement, the sensor has to be able to distinguish between useful light, for example of its own light transmitter or of an associated light transmitter, and environmental light or disturbances from other light sources. Depending on the application, for instance in particularly bright environments, with poorly remitting target objects, or with large measurement distances, this can be a very demanding task with an extremely small useful light level.

In this respect, due to the comparatively large detector surface of SPADs, their extraneous light input is also high. The amount of extraneous light in turn here decisively determines the signal to noise ratio (SNR). It is possible to limit the extraneous light in that a focusing of the received light beam is provided in the reception path and in that a diaphragm is position at the position where the cross-section is the smallest. This is, for example, the procedure in accordance with DE 10 2014 102 420 A1, with there an optical funnel element additionally being arranged behind the diaphragm toward the light receiver to guide the received light onto the light receiver and to additionally homogenize it.

Such a diaphragm, however, has to be adjusted and fixed in place. Due to component tolerances and to a limited adjustment quality, the diaphragm aperture is in practice selected as larger than would in particular be ideal for a signal to noise ratio that would be ideal. Signal losses due to received light portions that cannot pass through a diaphragm that is too small or that is displaced with respect to the received light beam would bring along a disproportionate loss of quality. Extraneous light passing through the diaphragm aperture beside the received light beam results in random detection events whose influence contributes as shot noise in accordance with a root function.

If the losses due to a non-ideal diaphragm are to be limited, low-tolerance components will have to be developed and produced and then adjusted with high precision and fixed in position with low distortion. The increases the manufacture due to component costs and complex and laborious processes that are additionally insufficiently flexible. It is additionally necessary to deal with dangerous materials such as adhesives, soldering apparatus and the like in the production process.

SUMMARY

It is therefore the object of the invention to find an optoelectronic sensor in which the robustness in the reception system is increased.

This object is satisfied by a method of manufacturing an optoelectronic sensor in which a diaphragm is arranged between the reception optics and the light receiver. The diaphragm is arranged in a focal plane of the reception optics in the reception unit of the sensor. The received light beam has the smallest cross-section at this diaphragm position. Depending on the embodiment, the focal plane is not precisely impinged due to tolerances; this is always still called an arrangement in the focal plane. At least the extraneous light portion which reaches the reception optics on the near field or at intermediate distances can be suppressed by the diaphragm. The diaphragm aperture is located within the focal plane where the received light beam passes through the diaphragm so that where possible no useful signal portions are lost in the diaphragm. The light receiver is preferably only installed last in the remaining reception unit of reception optics with a completed individual diaphragm.

The invention starts from the basic idea that the diaphragm is individually manufactured. This manufacture takes place using the reception optics, either because the reception optics directly participates in the manufacture or because its properties determine the manufacture of the diaphragm. Manufacturing a diaphragm here only preferably means the complete manufacture from raw materials. Manufacturing is also understood if the functional diaphragm aperture is only attached in a blank.

The aperture thus ideally matches the reception optics and the received light beam generated by the reception optics. The individual manufacture of the diaphragm replaces the adjustment or at least supplements it. The individual diaphragm is specifically manufactured for just that reception optics together with which it is inserted into the sensor. Conventionally, in contrast, a diaphragm would be obtained as a component for at least a complete batch of sensors and the sensor either has to accept the consequence of tolerances or this aspect is compensated by a complex adjustment.

The invention has the advantage that tolerances of the optically effective components are minimized in the reception path. It is possible to react to quality fluctuations of the reception optics by the individual diaphragm. A diaphragm aperture thereby becomes possible which is as small as possible and with which in the ideal case no extraneous light at all is collected outside the received light beam, but without thereby losing useful light. This produces an optimum signal to noise ratio and thus a higher measurement performance capability in an adjustment-free manufacturing process. Since it is possible to deal with tolerances of the components, tool costs and parts costs are reduced. In addition dangerous materials in production for special fixing processes are avoided.

The received light beam is preferably measured in the installation position of the reception optics to acquire a property of the individual diaphragm to be manufactured. Relevant properties can, for example, be the beam cross-section at specific Z positions or its location in space. In this respect, the direction of the optical axis of the reception unit is called the Z direction, without any restriction of generality.

The lateral position of the received light beam is preferably measured as the property, with a diaphragm having a diaphragm aperture being manufactured at this position as the individual diaphragm. The lateral position is the position on a plane perpendicular to the Z direction. It is ensured via this property that the received light beam is incident as exactly as possible on the diaphragm aperture in later operation and consequently passes through the diaphragm as completely as possible. The otherwise typical adjustment of the diaphragm is thereby replaced or at least supplemented in that the diaphragm aperture is affixed to the correct position by individual production.

The location of the focal plane is preferably measured as the property, with the diaphragm being positioned at this location. The spot size, that is the beam cross-section of the received light beam in at least one Z position, is preferably determined for this purpose. To locate the focal plane, the smallest beam cross-section can be looked at or can be interpolated in a plurality of Z positions. This is, however, also conceivable in one step in that the spot size is determined in a Z position that is located well before or behind the expected focal location. The still required Z offset can then be determined from the spot size measured there and from the expected spot size at the focus by means of beam offset.

A further conceivable property is the geometry of the beam cross-section since the shape and dimensions of the diaphragm aperture could be coordinated with the geometry of the received light beam at the smallest constriction in the focal plane. However, this practically only changes a little due to tolerances so that the shape and dimensions of the diaphragm aperture can therefore be fixed theoretically and in the same manner for all the sensors from the optical design.

The received light beam is preferably measured using a camera. The required properties can thus be relatively simply detected and reliably determined. Since only one camera is required to manufacture a plurality of sensors after one another, the costs only play a subordinate role even for a high-quality camera and image evaluation.

A projection surface, in particular a ground glass screen, is preferably arranged at a possible position of the individual diaphragm for the measurement. A received light spot is thereby generated in a plane and is then, for example, detected by a camera. The possible position of the individual diaphragm can approximately correspond to a focal plane expected without tolerances, but can also be directly selected at a spacing therefrom. It is here not only a question of impacting the actual later diaphragm position, but only a position in which the required properties can be deduced. It is also conceivable to move the projection surface in the Z direction to acquire more or better information.

The individual diaphragm is preferably manufactured in a production line of the sensor. The manufacture of the individual diaphragm thus becomes an integral step within the conventional production. No parts have to be purchased and no special process effort is required for the procuring and supply of the individual diaphragms.

The individual diaphragm is preferably manufactured by means of 3D printing. This should generally be designated as generative or additive methods independently of the specific embodiment of the 3D printing. Not only the diaphragm per se becomes individual, that is in particular with respect to position, shape, and size of the diaphragm aperture, by 3D printing. It is in particular also possible to manufacture the diaphragm directly at the correct Z position of the focal plane preferably previously detected by measuring the received light beam. The individual diaphragm is thus directly correctly adjusted qua manufacture at least in the lateral direction, preferably also in the Z direction. This manufacture is not only flexible, but also inexpensive.

Alternatively to an additive process, subtractive processes from a blank can also be considered in which blank the desired diaphragm aperture is individually affixed, for example by laser cutting, stamping, drilling, milling, eroding, lithography, or etching.

A diaphragm blank is preferably first arranged without a diaphragm aperture in the focal plane of the reception optics and then the diaphragm aperture is produced. The diaphragm aperture is directly produced at that point at which the received light beam should pass through. This can in particular be measured in that the diaphragm itself serves as the projection surface or ground glass screen.

The diaphragm aperture is preferably manufactured using a material processing laser whose optical path is guided through the reception optics. No advance measurement is preferably carried out on how the individual diaphragm should look at all for this purpose. Since the material processing laser itself passes through the reception optics, its optical path corresponds to the received light beam. For this purpose, the material processing laser should preferably have comparable beam properties, that is light, for example, should preferably be collimated from infinity. An artificial defocusing or an additional optical element is conceivable for the material processing laser to compensate deviations of the optical path, for instance due to deviating wavelengths, between the material processing laser and the later useful light.

The reception optics and the individual diaphragm are preferably mounted in an optics carrier. The optics carrier preferably has a tube between the reception optics and the diaphragm to guide the received light and to screen further extraneous light. The reception optics is advantageously already installed in the optics carrier when properties of the received light beam are measured or when the individual diaphragm adapted thereto is manufactured. Tolerances can thus no longer occur later to this extent.

The light receiver preferably has at least one avalanche photodiode element that is preloaded with a bias voltage above a breakdown voltage and is thus operated in Geiger mode. Such a SPAD receiver is particularly sensitive. The signal bandwidth is not limited in this respect. Due to the internal amplification in the photocell, its thermal noise is almost negligible. Such a light receiver is thus very particularly well-suited for an optical design with a diaphragm. The large detection surface provides space for a lateral offset of the received light beam to which the individual diaphragm only adapts without compensating it. A plurality of avalanche photodiodes are preferably provided. This provides an even larger detection surface and additionally enables a statistical evaluation.

A light transmitter is preferably arranged in a coaxial or biaxial arrangement with respect to the light receiver whose transmitted light beam generates the received light beam. It is, for example, a laser with which a transmission optics is preferably associated. The received light beam to which the individual diaphragm is adapted is preferably generated by the light transmitter. For this purpose, a reflector is, for example, arranged at a defined distance and leads the transmitted light beam back to the reception optics. The adjustment by manufacture of the individual diaphragm is thus not only correct in the reception path, but also between the transmission and reception paths. The invention does not define in which step and at what time in the production the light transmitter is installed. However, the light transmitters together with the transmission optics and reception optics are preferably located in their final positions before the individual diaphragm is manufactured or the properties of the received light beam required for this purpose are measured.

Alternatively to a separate light transmitter, the received light beam is generated by extraneous light, with a light transmitted preferably being used for this purpose having properties comparable to the operation with respect to wavelength, distance, angle, and beam cross-section. A reception unit is thus created that is used for a passive sensor without its own light transmitter or is afterward combined with a light transmitter.

The reception optics and a transmission optics of the light transmitter are preferably arranged in a common optics carrier. The adjustment between the transmission unit and the reception unit is thus specified very precisely from a construction aspect and no longer changes after fixing. Any remaining tolerances are compensated by the subsequent manufacture of the individual diaphragm.

The sensor is preferably a distance measuring sensor in which a time of flight measurement unit for determining a time of flight is connected to the light receiver. All known time of flight methods can be considered for this, that is pulse time of flight methods, phase methods or also pulse averaging methods. In an advantageous further development with respect to a laser scanner, the distance is not only measured in one direction, but rather complements a movable deflection unit such as a rotating mirror or the reception unit is installed in a movable measuring head.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
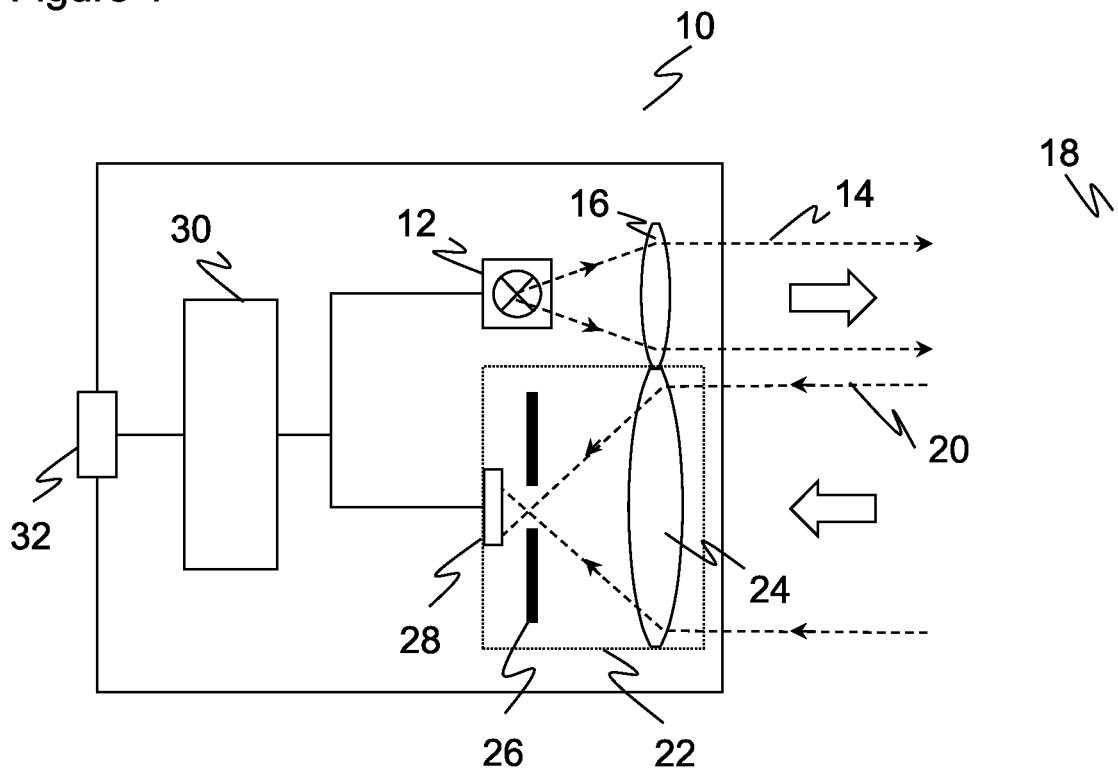
FIG. 1 a schematic sectional representation of an optoelectronic sensor.

FIG. 1 shows a block diagram of an optoelectronic sensor 10 that is configured by way of example as a light scanner. The sensor 10 has a light transmitter 12, for example a laser diode, whose transmitted light 14 is collimated in a transmission optics 16 and is then transmitted into a monitored zone 18. The light remitted at objects in the monitored zone 18 is conducted as received light 20 in a reception unit 22 having a reception optics 24 and a diaphragm 26 onto a light receiver 28.

Figure 2:
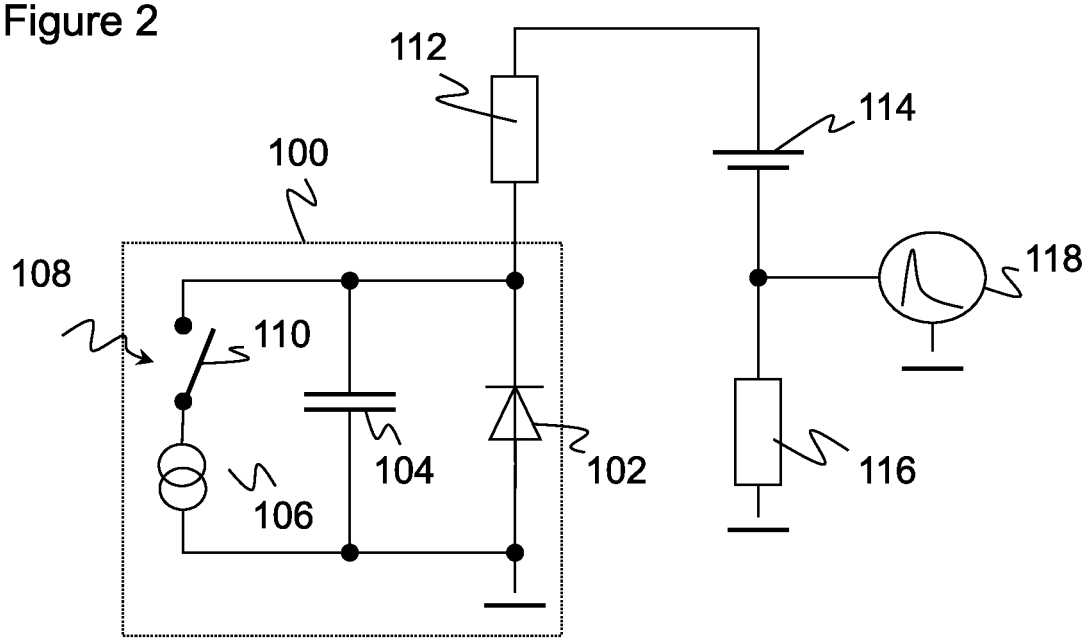
FIG. 2 an exemplary simplified equivalent circuit diagram of an avalanche photodiode usable in the light receiver of the sensor in accordance with FIG. 1 in Geiger mode.

The light receiver 28 can be configured as a simple reception surface of a photodiode, for instance. A plurality of light reception elements or pixels are preferably provided. The light reception element or the light reception elements of the light receiver 28 are preferably avalanche photodiodes that are operated in Geiger mode for the highly sensitive detection of received light 20. FIG. 2 shows an exemplary simplified equivalent circuit diagram of such an avalanche photodiode to explain this. In practice, it is a semiconductor component whose design, not shown, is assumed as known here. The avalanche photodiode 100 shows the behavior of a diode 102, on the one hand. It has a capacitance that is represented by a capacitor 104 connected in parallel. The possible avalanche effect generates charge carriers whose origin is shown in the equivalent circuit diagram as a current source 106. The avalanche effect is triggered by an incident photon 108, with this process acting like a switch 110. The avalanche photodiode is outwardly connected to a power source 114 via a resistor 112. The output signal can be observed at a point 118 between this power source and a further resistor 116.

In standby operation, a voltage above the breakdown voltage is applied across the diode 102. If an incident photon 108 then generates a charge carrier pair, this so-to-say closes the switch 110 so that the avalanche photodiode 106 is flooded with charge carriers via the current source 40. New charge carriers, however, only arise as long as the electrical field remains strong enough. If the capacitor 104 is discharged so much by the current source 106 that the breakdown voltage is fallen below, the avalanche self-quenches ("passive quenching"). The capacitor 104 is then recharged by the external power source 114 via the resistor 112 until a voltage above the breakdown voltage is again applied to the diode 102. There are alternative embodiments in which the avalanche is recognized from outside and a discharge is thereupon triggered below the breakdown voltage.

A control and evaluation unit 30 that is connected to the light transmitter 12 and to the light receiver 28 is furthermore provided in the sensor 10 in accordance with FIG. 1. The control and evaluation unit 30 detects objects in the monitored zone 18 with reference to the received signal of the light receiver 28. In this respect, in an embodiment of the sensor 10 as a distance measuring light sensor, the distance of the detected objects is also measured by transmitting light pulses and by determining the time of flight up to their reception. The evaluation unit 30 can output processed or raw measured sensor data via an output 32 or can conversely accept control and parameterization instructions.

The embodiment of the sensor 10 described with reference to FIG. 1 is only to be understood as an example. A large family of optoelectronic sensors can be manufactured in accordance with the invention, for example light barriers or light grids, distance sensors or laser scanners. These sensors 10 can differ substantially in design from FIG. 1; for example, the transmission channel and the reception channel can lead over a common beam splitter or can work passively and can thus fully dispense with a transmission channel. The invention primarily relates to the reception unit 22 and here specifically to the manufacture and adjustment of the diaphragm 26 that will be explained in the following, and less to the other design of the sensor 10.

Figure 3:
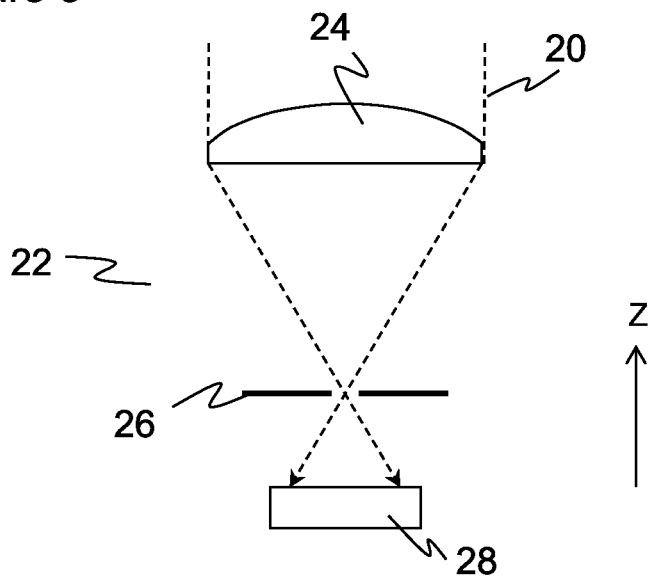
FIG. 3 a representation of the beam path in a reception unit with diaphragm.

FIG. 3 is a schematic representation of the beam progression in the reception unit 22. The diaphragm 26 is arranged at a spacing from the reception optics 24 in the direction of the optical axis of the reception unit 22, that is called the Z direction, so that the received light 20 particularly passes through the diaphragm aperture in the focus or at the point of smallest constriction. The diaphragm 26 is therefore in the focal plane of the reception optics 24. This condition preferably applies to received light 20 from infinity. Extraneous light laterally of the beam bundle formed by the received light 20 is screened from the light receiver 28 by the diaphragm 26.

The diaphragm aperture of the diaphragm 26 should only be just so large as the cross-section of the received light 20 at the point of smallest constriction for an ideal signal to noise ratio, but should simultaneously be exactly positioned laterally and, where possible, also in the Z direction so that no useful light is lost. This requires a very exact adjustment and fixing due to tolerances of the reception optics 24 and of a prefabricated diaphragm 26.

In accordance with the invention, an individual diaphragm 26 is instead manufactured whose diaphragm aperture is individually adapted to the beam progression of the received light 20 of just the reception optics 34 used in this sensor 10. The individual diaphragm 26 then only has to be positioned in the Z direction, with the manufacture even taking place directly at this correct Z position in a preferred embodiment. Different materials and production methods can be used here.

Due to the individually produced diaphragm 26, there is a tolerance decoupling of the optomechanical components with respect to the electronics, that is the reception optics 24, and of the diaphragm 26 with respect to the light receiver 28. Since the diaphragm 26 is exactly responsive to the tolerances of the reception optics 24, a lateral offset and a change of the spot size of the received light spot generated on the light receiver 28 by the received light 20 remain at best. However, this does not play any role as long as the light receiver 28 has a sufficiently large surface such as is in particular the case with a SPAD light receiver or with a SPAD matrix. There are thus no signal losses due to a positioning subject to tolerances.

FIG. 3 shows a simple converging lens by way of example as the reception optics 24. The reception optics 24 can in a different aspect also be multi-part and can in particular have a plurality of lenses or, as a Fresnel lens, can have a reflective element, for example, a concave mirror, or a diffractive element. In addition, a light-screening and light-conductive tube can be provided between the reception optics 24 and the diaphragm 26; in a similar manner, a homogenizer or a diaphragm funnel as in DE 10 2014 102 420 A1 or another optical element can be arranged between the light receiver 28 and the diaphragm 26.

Figure 4:
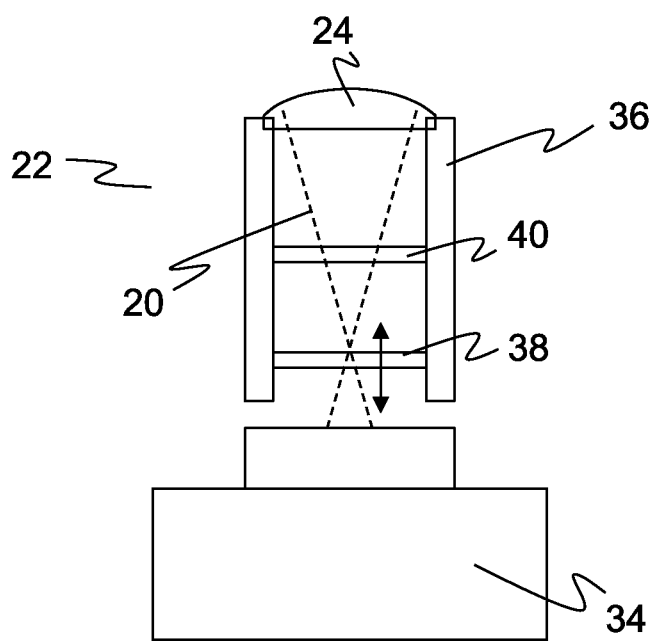
FIG. 4 a representation for illustrating the measurement of a received light beam in a reception unit by means of a camera.

FIG. 4 illustrates a first step of an embodiment for manufacturing an individual diaphragm 26. The beam bundle of the received light 20 is here measured in the reception unit 22 with the aid of a camera 34. The reception optics 24 is already completely set up at this time and is fixed in an optics carrier 36 in this example.

A ground glass screen 38 is inserted into the optics carrier 36 approximately where the diaphragm 26 should later be positioned. The exact location of the focal plane of the specifically installed reception optics 24 is not yet known. It is also not important to arrange the ground glass screen 38 exactly in the focal plane; it can rather be advantageous to differ from this depending on the procedure. An optional extraneous light filter 40 is shown above the ground glass screen 38; for example, a band pass filter that is coordinated with the wavelength of the light transmitter 12 and can be used for the measurement or also in the completed sensor 10.

The camera 34 now records an image of the ground glass screen 38 and measures the position and the geometry, in particular the size, of the beam cross-section of the received light 20 at the Z height of the ground glass screen 38. Depending on the embodiment, the Z position of the ground glass screen 38 is now varied until the smallest beam cross-section has been located or this Z position is interpolated from a plurality of measurements. On the basis of the general optical design of the reception optics 24, it can already be known how the beam cross-section has to appear in the focal plane. It is then also possible to draw a conclusion on the Z position of the focal plane of the installed reception optics 24 from only one Z position with the aid of the intercept theorem. Correspondingly, the lateral position is also measured, i.e. in the plane perpendicular to the Z direction, and is optionally adapted with a Z position of the ground glass screen 38 still differing from the Z position by means of the intercept theorem.

The Z position at which the individual diaphragm 26 is to be arranged and where the diaphragm aperture should be ideally affixed in the lateral direction are thus known. It is also conceivable to provide a fixed Z position or a selection of fixed Z positions for the diaphragm 26 in the optics carrier 36. The diaphragm 26 is then not exactly in the focal plane depending on the tolerances of the installed reception optics 24. It is, however, possible to ideally position the diaphragm aperture at least laterally for this Z location on the basis of the measurement by the camera 34. The diaphragm aperture can here also be a little bit larger than in the optimum Z location since it can rather be accepted for the signal to noise ratio that the extraneous light portion is somewhat larger than useful light is lost.

Figure 5:
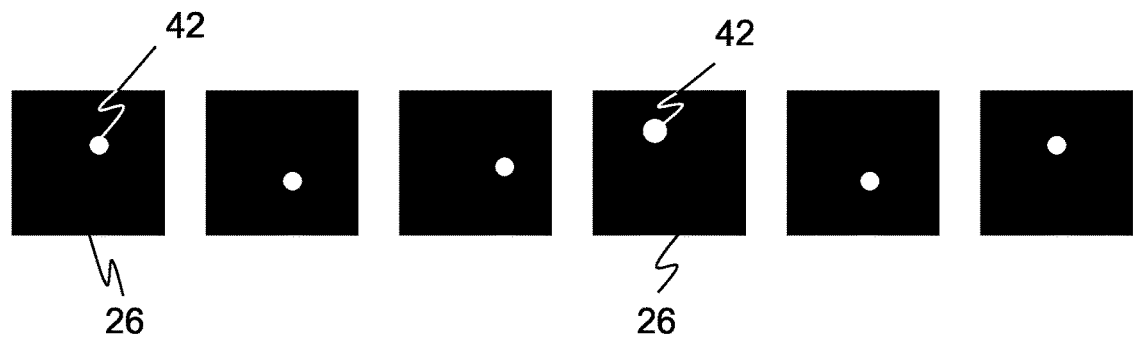
FIG. 5 a schematic plan view of different individual diaphragms corresponding to the received light beam.

FIG. 5 shows some examples of an individually produced diaphragm 26 on the basis of information acquired on the received light 20. The lateral displacement of the respective diaphragm aperture 42 is intentionally exaggerated for realistic tolerances to illustrate the process. Each of the diaphragms 26 shown is actually measured and produced for a specific example of a sensor 10.

The manufacture of the individual diaphragms 26 preferably takes place directly in the production line of the sensor 10. Additive processes that are also called 3D printing are very particularly suitable here, with all known technologies such as powder bed, free space, liquid material, or layer structure being able to be considered here. 3D printing even allows the diaphragm 26 to be printed at the correct Z position directly in the optics carrier 36. Otherwise the diaphragm 26 is printed outside the optics carrier 26 and then only has to be positioned in the Z direction in the optics carrier 36. In particular guide slots or steps in the optics carrier 36 and a matching outer contour of the diaphragm 26 can be considered for the Z positioning.

Subtractive processes are, however, alternatively also conceivable. They include laser cutting for sheet metal, paper, plastic, dissecting, in particular by stamping, cutting with geometrically defined blades such as drilling, milling, abrading or eroding, lithographic processes or etching processes.

Figure 6:
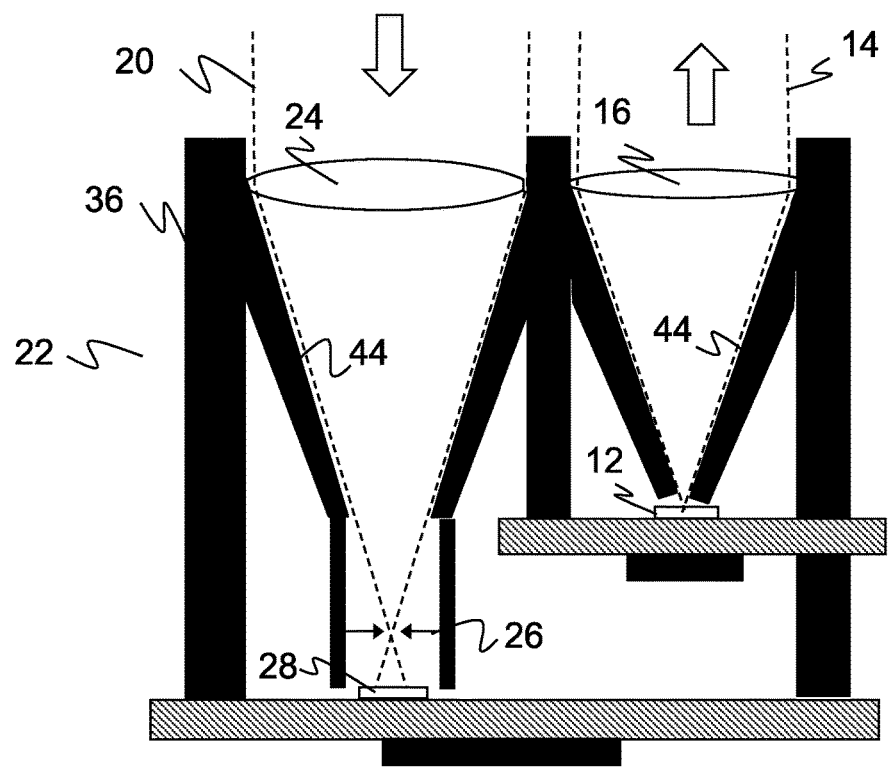
FIG. 6 a sectional representation of a transmission/reception module with an individual diaphragm in the reception unit.

FIG. 6 shows an example for a completed transmission/reception module of the sensor 10 where the individual diaphragm 26 has already been introduced in its target position. The common optics carrier 36 used by way of example here also comprises a respective tube 44 for the transmission path and for the reception path. If the sensor 10 as in this example has its own light transmitter 12, the light transmitter 12, transmission optics 16, and reception optics 24 are preferably already arranged and fixed in the optics carrier 36 before the manufacture of the individual diaphragm 26. The received light 20 with reference to which the required individual diaphragm 26 is measured by means of the camera 34 then has the same properties as later in operation. Alternatively, however, received light 20 can also be generated by an external light transmitter of the production line. Once the individual diaphragm 26 has been manufactured and affixed to its Z position, the light receiver 28 is finally installed.

Figure 7A:
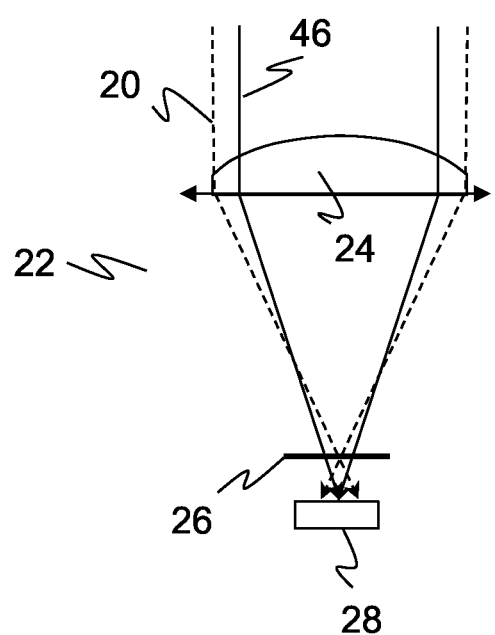
FIGS. 7a-b a representation of the beam path of the received light beam and of the light beam of a material processing laser before and after the generation of a diaphragm aperture for an individual diaphragm.

FIG. 7 illustrates a further embodiment of the manufacture of an individual diaphragm 26. Not only the reception optics 24, but also the diaphragm 26 is already fixed in the optics carrier 36 beforehand in this respect. At this point in time, in accordance with FIG. 7a, the diaphragm 26, however, does not yet have any functional diaphragm aperture 42, that is it is a still closed diaphragm blank. The Z position for the diaphragm blank can be fixedly specified from the optical design and is then subject to tolerances that are accepted. Alternatively, however, it is also conceivable first to measure the Z position of the specific reception optics 24 and to position the diaphragm blank there.

Figure 7B:
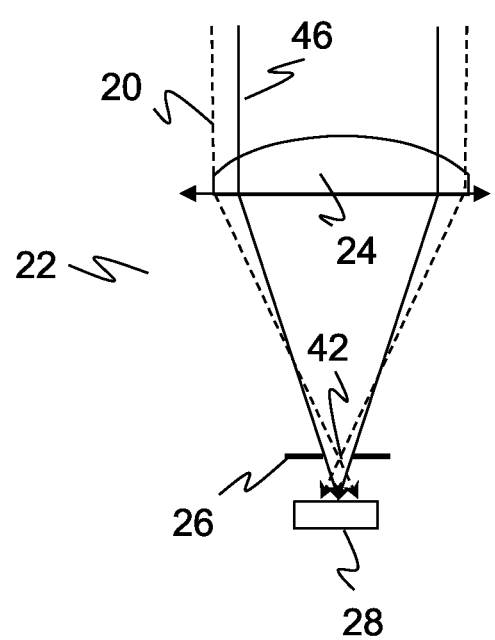

In order now to affix the diaphragm aperture 24, the optical imaging of the reception optics 24 is used to image the expanded and collimated laser beam 46 of a material processing laser in the direction of the diaphragm 26. The reception optics 34 densifies the beam bundle of the laser and thus greatly increases the laser power density at the location of the diaphragm and a hole or the diaphragm aperture 42 arises by ablation. The wavelength of the material processing laser $\lambda_{Processing}$ is to be selected such that the diaphragm has the desired aperture at the working wavelength of the sensor $\lambda_{Sensor}$ to be produced. The wavelength of the material processing laser is not the only possible tuning parameter for the desired diaphragm aperture 42. If, for example, $\lambda_{Processing} \gg \lambda_{Sensor}$, as in the case of a CO2 laser at 10,600 nm, the focus can be imaged at the correct focal position by a direct decollimation of the widened laser beam, whether by disadjustment of the beam expansion system or by an additional optics. FIG. 7b shows the reception unit 22 with a machined diaphragm 26.

A material processing laser has the great advantage that its laser beam 46 is guided directly through the reception optics 24 and therefore automatically takes its tolerances into account. It is nevertheless also conceivable to affix the diaphragm aperture 42 individually in a diaphragm blank using a different method, in particular using one of the above-named subtractive methods. The lateral position of the diaphragm aperture 42 is measured for this purpose, for example as in FIG. 4 with the aid of a camera 34 and a ground glass screen 38, with the diaphragm blank itself being able to have properties which enable the function of a projection surface similar to the ground glass screen 38.

Beyond what was described above, the individual diaphragm 26 also allows the dispensing with of near field zones otherwise typical for some sensors 10 in the reception optics 24 and to map this function in the diaphragm 26. Lenses having a near field zone are as a rule tool-related parts that only permit a little variation in use. With the near field zone in the diaphragm 26, standard lenses can be used that are less expensive or are of higher quality and, additionally, device variants can be generated at a very late production step. This allows the volume to be increased and manufacturing costs are thereby also reduced.

The invention claimed is:

1. A method of manufacturing an optoelectronic sensor, the optoelectronic sensor comprising a reception unit having a reception optics, a light receiver, and a diaphragm having a diaphragm aperture, with the diaphragm being arranged between the reception optics and the light receiver, wherein the diaphragm is arranged in a focal plane of the reception optics so that a received light beam generated by the reception optics is incident through the diaphragm aperture at the diaphragm at the point of smallest constriction, the method comprising manufacturing the diaphragm as an individual diaphragm using the reception optics so as to manufacture the diaphragm aperture specifically for the reception optics that is used in the sensor together with the individual diaphragm.

2. The method in accordance with claim 1, the method further comprising the step of:
    measuring the received light beam in the installation position of the reception optics to acquire a property of the individual diaphragm to be manufactured.

3. The method in accordance with claim 2,
    wherein the lateral position of the received light beam is measured as the property; and
    wherein a diaphragm having a diaphragm aperture is manufactured as the individual diaphragm at this lateral position.

4. The method in accordance with claim 2,
    wherein the location of the focal plane is measured as the property; and wherein the diaphragm is positioned at this location.

5. The method in accordance with claim 2,
    the method further comprising the step of
    measuring the received light beam using a camera.

6. The method in accordance with claim 2,
    the method further comprising the step of:
    arranging a projection surface at a possible position of the individual diaphragm for the measurement.

7. The method in accordance with claim 6,
    wherein the projection surface is a ground glass screen.

8. The method in accordance with claim 1,
    wherein the individual diaphragm is manufactured in a production line of the sensor.

9. The method in accordance with claim 1,
    wherein the individual diaphragm is manufactured by means of 3D printing.

10. The method in accordance with claim 1, the method comprising the further steps of:
first arranging a diaphragm blank without a diaphragm aperture in the focal plane of the reception optics, and
then generating the diaphragm aperture.

11. The method in accordance with claim 10, wherein the diaphragm aperture is generated using a material processing laser having an optical path, with the optical path being led through the reception optics.

12. The method in accordance with claim 1, wherein the reception optics and the individual diaphragm are installed in an optics carrier.

13. The method in accordance with claim 1, wherein the light receiver has at least one avalanche photodiode element that is preloaded with a bias voltage above a breakdown voltage and is thus operated in Geiger mode.

14. The method in accordance with claim 1, wherein a light transmitter is arranged in a coaxial or biaxial arrangement with respect to the light receiver whose transmitted light beam generates the received light beam.

15. The method in accordance with claim 14, wherein the reception optics and a transmission optics of the light transmitter are arranged in a common optics carrier.

16. The method in accordance with claim 1, wherein the sensor is a distance measuring sensor in which a time of flight measurement unit is connected to the light receiver for determining a time of flight.

17. The method in accordance with claim 16, wherein the distance measuring sensor is a laser scanner.

18. A method for manufacturing an optoelectronic sensor which has a receiving unit with a receiving optics, a light receiver and a diaphragm between them, the diaphragm being arranged in a focal plane of the receiving optics so that a received light beam generated by the receiving optics falls through a diaphragm aperture of the diaphragm at the point of smallest constriction, the method comprising manufacturing the diaphragm with use of the receiving optics as an individual diaphragm having an aperture specifically for the receiving optics that is used in the sensor together with the diaphragm.

* * * * *